United States Patent
Hayama et al.

(10) Patent No.: US 12,129,840 B2
(45) Date of Patent: Oct. 29, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 215 days.

(21) Appl. No.: 17/771,412

(22) PCT Filed: Oct. 23, 2020

(86) PCT No.: PCT/JP2020/039833
§ 371 (c)(1),
(2) Date: Apr. 22, 2022

(87) PCT Pub. No.: WO2021/085318
PCT Pub. Date: May 6, 2021

(65) Prior Publication Data
US 2022/0381364 A1 Dec. 1, 2022

(30) Foreign Application Priority Data

Oct. 28, 2019 (JP) .................................. 2019-195454

(51) Int. Cl.
*F04B 27/18* (2006.01)
*F16K 31/06* (2006.01)
(52) U.S. Cl.
CPC .......... *F04B 27/1804* (2013.01); *F16K 31/06* (2013.01); *F04B 27/18* (2013.01);
(Continued)

(58) Field of Classification Search
CPC .................. F04B 27/1804; F04B 27/18; F04B 2027/1818; F04B 2027/1831; F04B 2027/185; F16K 31/06
See application file for complete search history.

(56) References Cited

U.S. PATENT DOCUMENTS

| 2,267,515 A | 12/1941 | Wilcox |
| 2,470,470 A | 5/1949 | Carbon ................. F16K 31/406 |

(Continued)

FOREIGN PATENT DOCUMENTS

| EP | 0771948 | 5/1997 | .............. F04B 27/18 |
| EP | 2594794 | 5/2013 | .............. F04B 27/18 |

(Continued)

OTHER PUBLICATIONS

European Search Report issued in related Application Serial No. 20881943.3, dated Nov. 9, 2023, 8 pages.

(Continued)

*Primary Examiner* — Charles G Freay
(74) *Attorney, Agent, or Firm* — HAYES SOLOWAY P.C.

(57) ABSTRACT

A capacity control valve includes: a valve housing provided with a suction port through which a suction fluid of a suction pressure passes and a control port through which a control fluid of a control pressure passes; a valve body driven by a solenoid; a spring that biases the valve body in a direction opposite to a direction of driving by the solenoid; a CS valve that includes a CS valve seat and the valve body, and that moves the valve body to open and close a communication between the control port and the suction port, the capacity control valve opening and closing the CS valve to control the control pressure, in which the control fluid of the control pressure is suppliable to a back side of the valve body.

13 Claims, 9 Drawing Sheets

(52) U.S. Cl.
CPC ................. *F04B 2027/1818* (2013.01); *F04B 2027/1831* (2013.01); *F04B 2027/185* (2013.01)

(56) References Cited

U.S. PATENT DOCUMENTS

| | | | |
|---|---|---|---|
| 3,100,103 A | 8/1963 | Bullard | F16K 31/408 |
| 3,250,293 A | 5/1966 | Adams | G05D 7/0635 |
| 3,250,294 A | 5/1966 | Hipple | G05B 11/60 |
| 3,360,304 A | 12/1967 | Adams | B61K 7/12 |
| 3,903,919 A | 9/1975 | Zuener | F16K 31/406 |
| 4,305,566 A | 12/1981 | Grawunde | F16K 31/406 |
| 4,553,732 A | 11/1985 | Brundage | F16K 31/0655 |
| 4,579,145 A | 4/1986 | Lieber | F16H 61/0251 |
| 4,615,358 A | 10/1986 | Hammond | F15B 13/0402 |
| 4,873,817 A | 10/1989 | Harms | F16K 17/105 |
| 4,895,192 A | 1/1990 | Mortenson | F01M 11/04 |
| 4,917,150 A | 4/1990 | Koch | F16K 31/0606 |
| 4,964,611 A | 10/1990 | Anderson | F16K 31/406 |
| 4,979,542 A | 12/1990 | Mesenich | F02M 47/027 |
| 4,998,559 A | 3/1991 | McAuliffe | F16H 61/0251 |
| 5,020,772 A | 6/1991 | Degenfelder | G05D 7/0635 |
| 5,048,790 A | 9/1991 | Wells | F16K 31/383 |
| 5,060,695 A | 10/1991 | McCabe | G05D 16/2024 |
| 5,063,829 A | 11/1991 | Takao et al. | F01B 3/00 |
| 5,072,752 A | 12/1991 | Kolchinsky | F16K 31/406 |
| 5,217,047 A | 6/1993 | McCabe | F16H 61/0251 |
| 5,242,274 A * | 9/1993 | Inoue | F04B 27/1804 |
| | | | 417/270 |
| 5,286,172 A | 2/1994 | Taguchi | F04B 1/26 |
| 5,301,920 A | 4/1994 | Ichiki | F16K 31/0668 |
| 5,538,026 A | 7/1996 | Kazi | F16K 31/06 |
| 5,778,932 A | 7/1998 | Alexander | G05D 16/2024 |
| 5,992,450 A | 11/1999 | Parker | F16K 31/406 |
| 6,161,585 A | 12/2000 | Kolchinsky | G05D 16/2024 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,434,956 B1 | 8/2002 | Ota | 62/133 |
| 6,457,696 B1 | 10/2002 | Hirota | G05D 7/005 |
| 6,971,232 B2 | 12/2005 | Singh | F16B 13/405 |
| 7,014,427 B1 | 3/2006 | Hirota | 417/218 |
| 7,117,889 B2 | 10/2006 | Koyama | F16K 31/142 |
| 8,021,124 B2 | 9/2011 | Umemura et al. | 417/222.2 |
| 8,225,818 B1 | 7/2012 | Stephens | F15B 13/0442 |
| 9,022,346 B2 | 5/2015 | Najmolhoda | F16K 31/0613 |
| 9,027,598 B2 | 5/2015 | Schneider | F16K 31/0613 |
| 9,453,518 B2 | 9/2016 | Schulz | F15B 13/043 |
| 9,581,150 B2 | 2/2017 | Ota et al. | F04B 27/18 |
| 10,400,912 B2 | 9/2019 | Schulz | F16K 31/406 |
| 10,557,483 B1 | 2/2020 | Zahe | F16K 13/0426 |
| 10,774,853 B2 | 9/2020 | Zahe | F16K 17/168 |
| 10,775,812 B1 | 9/2020 | Zahe | F16K 17/044 |
| 11,473,683 B2 | 10/2022 | Hayama | F16K 11/22 |
| 11,512,786 B2 | 11/2022 | Hayama | F16K 11/24 |
| 11,802,552 B2 | 10/2023 | Fukudome | F16K 31/406 |
| 2001/0016168 A1 | 8/2001 | Mameda et al. | F04B 1/26 |
| 2002/0134444 A1 | 9/2002 | Isobe | F16K 27/041 |
| 2004/0060604 A1 | 4/2004 | Uemura et al. | 137/595 |
| 2004/0120829 A1 | 6/2004 | Pitla et al. | F04B 27/18 |
| 2005/0076959 A1 | 4/2005 | Yamamoto | F16K 31/0624 |
| 2005/0265853 A1 | 12/2005 | Hirota | F04B 1/12 |
| 2006/0165534 A1 | 7/2006 | Umemura et al. | F04B 1/26 |
| 2006/0218953 A1 | 10/2006 | Hirota | 62/228.5 |
| 2008/0138213 A1 | 6/2008 | Umemura | F04B 27/1804 |
| 2009/0183786 A1 | 7/2009 | Iwa et al. | 137/487.5 |
| 2009/0256091 A1 | 10/2009 | Nordstrom | F16K 31/0613 |
| 2011/0089352 A1 | 4/2011 | Morgan | F16K 11/0716 |
| 2012/0198992 A1 | 8/2012 | Futakuchi et al. | 91/505 |
| 2014/0130916 A1 | 5/2014 | Saeki et al. | F16K 31/0613 |
| 2014/0369862 A1* | 12/2014 | Ota | F04B 27/1804 |
| | | | 417/222.2 |
| 2015/0027573 A1 | 1/2015 | Ochiai | F15B 13/0402 |
| 2015/0044065 A1 | 2/2015 | Ota | F04B 27/18 |
| 2015/0044067 A1 | 2/2015 | Ota | F04B 27/1804 |
| 2015/0211506 A1 | 7/2015 | Shirafuji et al. | F04B 27/1804 |
| 2015/0345655 A1 | 12/2015 | Higashidozono et al. | F16K 31/0624 |
| 2017/0356430 A1 | 12/2017 | Irie et al. | F04B 27/1804 |
| 2018/0156345 A1 | 6/2018 | Kanda | F15B 13/0431 |
| 2021/0180715 A1 | 6/2021 | Hayama et al. | F16K 31/122 |
| 2022/0213877 A1* | 7/2022 | Hayama | F04B 27/18 |

FOREIGN PATENT DOCUMENTS

| | | | |
|---|---|---|---|
| EP | 2784320 | 10/2014 | F04B 27/18 |
| EP | 3431760 | 1/2019 | F04B 27/18 |
| JP | 5306679 | 11/1993 | F04B 27/08 |
| JP | 6-200875 | 7/1994 | F04B 27/08 |
| JP | 3088536 | 7/2000 | F04B 27/08 |
| JP | 2000249051 A * | 9/2000 | F04B 27/1804 |
| JP | 2000-345961 | 12/2000 | F04B 27/14 |
| JP | 2001-73939 | 3/2001 | F04B 27/14 |
| JP | 2001-107854 | 4/2001 | F04B 27/14 |
| JP | 2001-132632 | 5/2001 | F04B 27/14 |
| JP | 3581598 | 7/2004 | F04B 29/10 |
| JP | 2006-17035 | 1/2006 | F04B 27/14 |
| JP | 2006-52648 | 2/2006 | F04B 27/14 |
| JP | 2006-170140 | 6/2006 | F04B 27/14 |
| JP | 2006-307828 | 11/2006 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 2011-94554 | 5/2011 | F04B 27/08 |
| JP | 5167121 | 12/2012 | F04B 27/14 |
| JP | 5557901 | 6/2014 | F04B 27/14 |
| JP | 2014-190247 | 10/2014 | F04B 27/14 |
| JP | 2015-1168 | 1/2015 | F04B 27/14 |
| JP | 2015-34509 | 2/2015 | F04B 27/14 |
| JP | 2015-34510 | 2/2015 | F04B 27/14 |
| JP | 6135521 | 5/2017 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-021646 | 2/2018 | F04B 27/18 |
| JP | 2018-40385 | 3/2018 | F16K 31/06 |
| JP | 2018-145877 | 9/2018 | F04B 27/12 |
| WO | WO 2007119380 | 10/2007 | F04B 27/14 |
| WO | WO2013109005 | 7/2013 | F04B 27/14 |
| WO | WO 2014091975 | 6/2014 | F04B 27/14 |
| WO | WO 2014119594 | 8/2014 | F04B 27/14 |
| WO | WO 2017057160 | 4/2017 | F04B 27/18 |
| WO | WO 2017159553 | 9/2017 | F04B 27/18 |
| WO | WO2018207461 | 11/2018 | F04B 27/18 |
| WO | WO2019131703 | 7/2019 | F04B 27/18 |
| WO | WO2019167912 | 2/2021 | F04B 27/18 |

OTHER PUBLICATIONS

Chinese Official Action issued in related Chinese Official Action issued in Application No. 202080049328.6 dated Jan. 31, 2023 with English Translation, 7 pages.
Chinese Official Action issued in related Chinese Official Action issued in Application No. 202080074812.4 dated Jan. 18, 2023 with English Translation, 10 pages.
European Search Report issued in related Application Serial No. 19891826.0, dated May 25, 2022, 7 pages.
European Search Report issued in related Application Serial No. 20837707.7, dated May 4, 2023, 5 pages.
European Search Report issued in related Application Serial No. 20841388.0, dated Jun. 14, 2023, 4 pages.
Notice of Allowance issued in related U.S. Appl. No. 17/622,667 dated Jun. 14, 2023, 11 pages.
International Search Report and Written Opinion issued in PCT/JP2020/026722, dated Sep. 29, 2020, with English translation, 11 pages.
International Preliminary Report on Patentability issued in PCT/JP2020/026722, dated Jan. 20, 2022, 5 pages.
International Search Report and Written Opinion issued in PCT/JP2020/026723, dated Sep. 8, 2020, with English translation, 11 pages.

(56) References Cited

OTHER PUBLICATIONS

International Preliminary Report on Patentability issued in PCT/JP2019/026723, dated Jan. 18, 2022, 4 pages.
International Preliminary Report on Patentability issued in PCT/JP2019/020196, dated Nov. 24, 2020, with English translation, 6 pages.
International Search Report and Written Opinion issued in PCT/JP2019/020196, dated Aug. 27, 2019, with English translation, 11 pages.
International Preliminary Report on Patentability issued in PCT/JP2019/047193, dated Dec. 3, 2021, with English translation, 6 pages.
International Search Report and Written Opinion issued in PCT/JP2019/047193, dated Aug. 27, 2019, with English translation, 11 pages.
International Preliminary Report on Patentability issued in PCT/JP2020/039833, dated May 3, 2022, with English translation, 5 pages.
International Search Report and Written Opinion issued in PCT/JP2020/039833, dated Dec. 8, 2020, with English translation, 13 pages.
Chinese Official Action issued in related Chinese Official Action dated Dec. 1, 2021 with English Translation, 7 pages.
Notice of Allowance issued in related U.S. Appl. No. 17/056,988, dated Oct. 27, 2021 9 pages.
Notice of Allowance issued in related U.S. Appl. No. 17/299,288, dated Apr. 19, 2022, 12 pages.
U.S. Appl. No. 17/622,667, filed Dec. 23, 2021, Fukudome et al.
U.S. Appl. No. 17/618,169, filed Dec. 10, 2021, Fukudome et al.
Official Action issue in related U.S. Appl. No. 17/619,169, dated Mar. 14, 2024, 12 pages.
European Official Action issued in related European Application 20881943.3, dated Nov. 9, 2023, 8 pages.
Korean Official Action issued in related Korean Application 10-2022-7014816, dated Mar. 3, 2024, with translation, 9 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a control-suction valve (also referred to as a CS valve) provided between a control port through which a control fluid of the control pressure Pc passes and a suction port through which a suction fluid of the suction pressure Ps passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed, so that the stroke amount of the pistons is changed, and the discharge amount of the fluid to the discharge chamber is controlled, and thereby the air conditioning system is adjusted to a target cooling capacity.

A capacity control valve of Patent Citation 1 changes the discharge amount of the fluid to be discharged from the discharge chamber by opening and closing the CS valve to control the fluid of the control pressure Pc to be released from the control chamber to the suction chamber of the variable displacement compressor, and bringing a pressure difference between the discharge pressure Pd of the discharge chamber and the control pressure Pc of the control chamber, each of which is applied in a stroke direction of the pistons, to a target value. In addition, the valve opening degree of the CS valve changes according to an electromagnetic force due to an electric current applied to the solenoid, the target value of the pressure difference is changed according to the change, and the discharge amount of the fluid to be discharged from the discharge chamber is changed.

In addition, in Patent Citation 1, a pressure-sensitive portion including a diaphragm is provided in a pressure-sensitive chamber of the capacity control valve, and the pressure-sensitive portion changes a force to move the valve body according to the suction pressure Ps to adjust the valve opening degree of the CS valve. In addition, the suction fluid of the suction pressure Ps to be supplied to the pressure-sensitive chamber is guided to a back side of the valve body through a communication passage formed in a shaft and a plunger that form the valve body and the solenoid, and influences of the suction pressure Ps applied to both sides of the valve body in a movement direction are cancelled out.

CITATION LIST

Patent Literature

Patent Citation 1: JP 2011-94554 A (PAGE 10, FIG. 2)

SUMMARY OF INVENTION

Technical Problem

However, in Patent Citation 1, the controllability of the CS valve is excellent since the influences of the suction pressure Ps are cancelled out, but when the CS valve is opened, a pressure receiving area for the control pressure Pc in the valve body is larger on a pressure receiving surface side to which the control pressure Pc is applied in a valve opening direction. Hence, the control pressure Pc higher than the suction pressure Ps is applied to bias the valve body in the valve opening direction, and the responsiveness of the capacity control valve is decreased, which is a problem. In addition, when the CS valve is opened, the fluid of the control pressure flows around to the back side of the valve body, so that the energy efficiency is decreased.

The present invention has been made in view of such problems, and an object of the present invention is to provide a capacity control valve capable of improving responsiveness.

Solution to Problem

In order to solve the above problems, a capacity control valve according to the present invention includes: a valve housing provided with a suction port through which a suction fluid of a suction pressure passes and a control port through which a control fluid of a control pressure passes; a valve body to be driven by a solenoid; a spring that biases the valve body in a direction opposite to a direction of driving by the solenoid; and a CS valve that includes a control-suction valve seat (also referred to as a CS valve seat) and the valve body, and that moves the valve body to open and close a communication between the control port and the suction port, the capacity control valve opening and closing the CS valve to control the control pressure, in which the control fluid of the control pressure is suppliable to a back side of the valve body, and the capacity control valve further includes a flow passage control device that uses a fluid pressure generated by opening and closing of the CS valve and a pressure on the back side of the valve body to decrease the pressure on the back side of the valve body. According to the aforesaid feature of the present invention, when the pressure of the fluid on the back side of the valve body is increased, the flow passage control device uses a pressure difference between the fluid pressure generated by opening and closing of the CS valve, and the pressure on the back side of the valve body to discharge the fluid on the back side of the valve body through a flow passage, so that the pressure on the back side of the valve body can be decreased to reduce an influence of the control pressure which is applied to the valve body. Therefore, the responsiveness of the capacity control valve can be improved.

It may be preferable that the flow passage control device includes an actuating valve body and a biasing device, and the flow passage control device is a valve in which a force due to the fluid pressure and a biasing force of the biasing device are opposed to a force due to the pressure on the back side of the valve body. According to this preferable configuration, since the actuating valve body biased by the biasing device can be operated according to the pressure difference between the fluid pressure generated because of a decrease in the control pressure by opening of the CS valve, and the pressure on the back side of the valve body, the flow passage control device for decreasing the pressure on the back side of the valve body can be simply configured.

It may be preferable that the fluid pressure is a pressure on a downstream side of the CS valve, and the biasing device biases the actuating valve body in a valve opening direction. According to this preferable configuration, since a flow of the control fluid of the control pressure from an upstream side to the downstream side of the CS valve is generated by opening of the CS valve to increase the pressure on the downstream side of the CS valve, the flow passage control device can be configured to open the flow passage that discharges the fluid on the back side of the valve body when the sum of the force due to the fluid pressure and the biasing force of the biasing device is larger than the force due to the pressure on the back side of the valve body, and the pressure on the back side of the valve body can be rapidly decreased to further improve responsiveness of the capacity control valve. Incidentally, the upstream side and the downstream side of the CS valve are a control port side and a suction port side of the CS valve, respectively, and the same applies to the following description.

It may be preferable that the fluid pressure is a pressure on an upstream side of the CS valve, and the biasing device biases the actuating valve body in a valve closing direction. According to this preferable configuration, since a flow of the control fluid of the control pressure from the upstream side to the downstream side of the CS valve is generated by opening of the CS valve to decrease the pressure on the upstream side of the CS valve, the flow passage control device can be configured to open the flow passage that discharges the fluid on the back side of the valve body when the sum of the force due to the fluid pressure and the biasing force of the biasing device is smaller than the force due to the pressure on the back side of the valve body, and a state where a pressure difference between the pressure on the back side of the valve body and the pressure on the upstream side of the CS valve is small is maintained. Therefore, the controllability of the capacity control valve can be improved.

It may be preferable that the capacity control valve further includes a pressure-actuated valve to be actuated to open and close a communication between an upstream side of the CS valve and the back side of the valve body by a pressure difference. According to this preferable configuration, when the control pressure on the upstream side of the CS valve is increased, the pressure-actuated valve is opened, the upstream side of the CS valve and the back side of the valve body communicate with each other, and the control fluid of the control pressure is supplied to the back side of the valve body, so that the pressure on the back side of the valve body is increased to reduce an influence of the control pressure applied to the valve body. Therefore, the responsiveness of the capacity control valve can be improved. In addition, when the control pressure is decreased, the pressure-actuated valve is closed, and the supply of the control fluid of the control pressure to the back side of the valve body is cut off. Therefore, when the flow passage that discharges the fluid on the back side of the valve body is opened by the flow passage control device, the pressure on the back side of the valve body can be efficiently decreased, so that the responsiveness of the capacity control valve can be further improved.

It may be preferable that the flow passage control device is provided in a through-hole of the valve housing, the through-hole communicating with the suction port. According to this preferable configuration, since the flow passage control device can be formed using the through-hole of the valve housing, the through-hole communicating with the existing suction port, the structure of the capacity control valve can be simplified.

It may be preferable that the flow passage control device is provided in a through-hole of the valve housing, the through-hole communicating with the upstream side of the CS valve. According to this preferable configuration, since the flow passage control device can be formed using the through-hole of the valve housing, the structure of the capacity control valve can be simplified.

DESCRIPTION OF EMBODIMENTS

Figure 1:
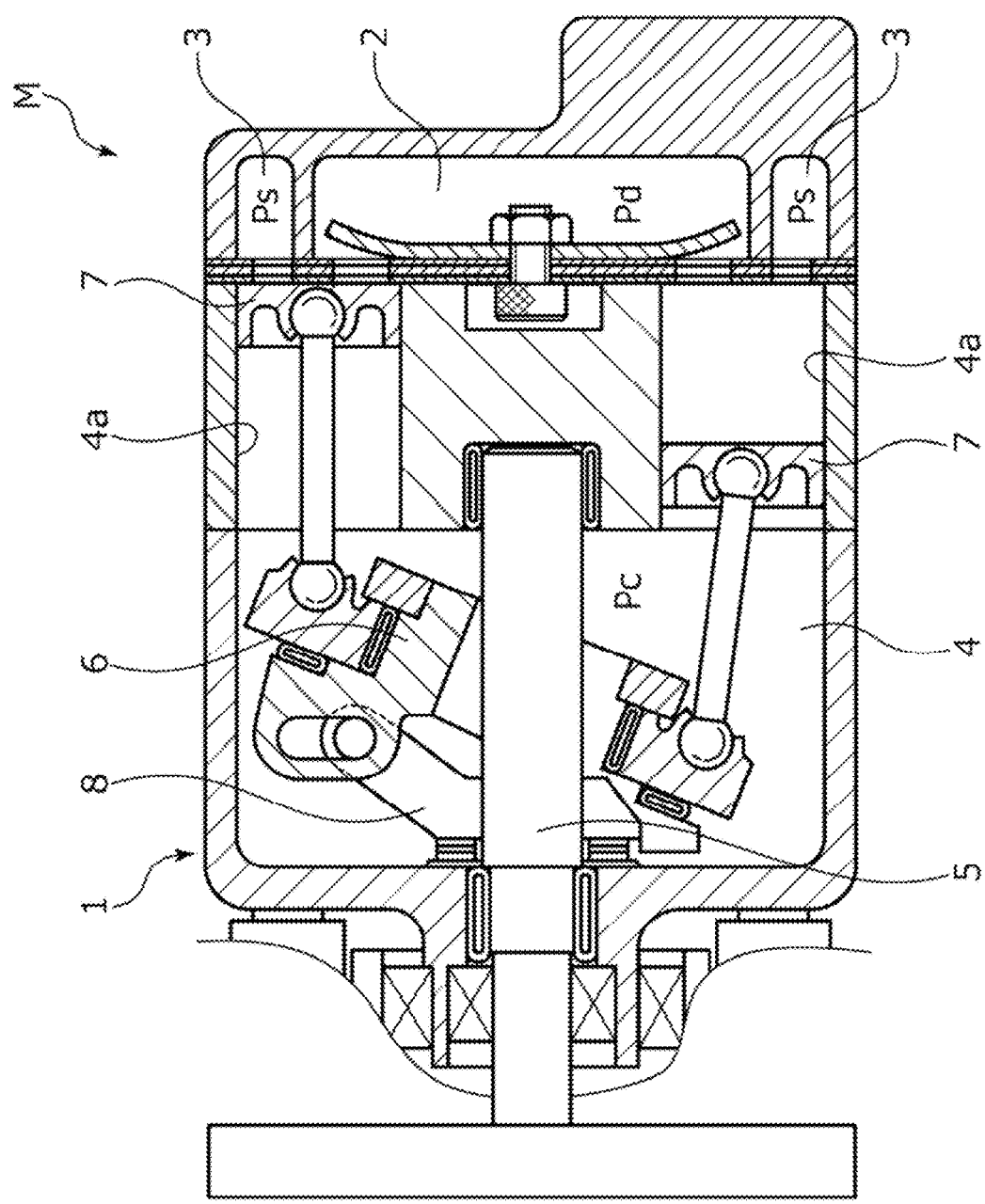
FIG. 1 is a schematic configuration view showing a swash plate-type variable displacement compressor into which a capacity control valve according to a first embodiment of the present invention is assembled.

Modes for implementing a capacity control valve according to the present invention will be described below based on embodiments.

First Embodiment

A capacity control valve according to a first embodiment of the present invention will be described with reference to FIGS. 1 to 5. In the following description, right and left sides of FIG. 2 as viewed from a front side are right and left sides of the capacity control valve. In detail, a description will be given based on the assumption that the left side of the drawing sheet on which a valve housing 10 is disposed is the left side of the capacity control valve and the right side of the drawing sheet on which a solenoid 80 is disposed is the right side of the capacity control valve.

A capacity control valve V of the present invention is assembled into a variable displacement compressor M used for an air conditioning system of an automobile, etc., and by variably controlling the pressure of a working fluid (hereinafter, simply referred to as a "fluid") which is a refrigerant, controls a discharge amount of the variable displacement compressor M to adjust the air conditioning system to a target cooling capacity.

First, the variable displacement compressor M will be described. As shown in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage through which the discharge chamber 2 and the control chamber 4 directly communicate with each other, and the communication passage is provided with a fixed orifice 9 that adjusts and balances the pressures of the discharge chamber 2 and the control chamber 4 (see FIG. 2).

In addition, the variable displacement compressor M includes a rotating shaft 5 to be driven and rotated by an engine (not shown) installed outside the casing 1; a swash plate 6 coupled to the rotating shaft 5 so as to be tiltable by a hinge mechanism 8 in the control chamber 4; and a plurality of pistons 7 coupled to the swash plate 6 and reciprocatably fitted in the respective cylinders 4a. The tilt angle of the swash plate 6 is continuously changed by appropriately controlling pressure in the control chamber 4 while utilizing a suction pressure Ps of the suction chamber 3 that suctions the fluid, a discharge pressure Pd of the discharge chamber 2 that discharges the fluid pressurized by the pistons 7, and a control pressure Pc of the control chamber 4 that houses the swash plate 6, by means of the capacity control valve V to be driven to open and close by electromagnetic force. Thereby, the stroke amount of the pistons 7 is changed to control the discharge amount of the fluid. Incidentally, for convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 is, and thus the stroke amount of the pistons 7 is reduced. When the control pressure Pc reaches a certain pressure or higher, the swash plate 6 is substantially perpendicular to the rotating shaft 5, namely, is slightly tilted from perpendicularity. In this case, since the stroke amount of the pistons 7 is minimized and the pressurization of the fluid in the cylinders 4a by the pistons 7 is minimized, the discharge amount of the fluid to the discharge chamber 2 is reduced, and the cooling capacity of the air conditioning system is minimized. On the other hand, the lower the control pressure Pc in the control chamber 4 is, the larger the tilt angle of the swash plate 6 with respect to the rotating shaft 5 is, and thus the stroke amount of the pistons 7 is increased. When the control pressure Pc reaches a certain pressure or lower, the swash plate 6 forms a maximum tilt angle with respect to the rotating shaft 5. In this case, since the stroke amount of the pistons 7 is maximized and the pressurization of the fluid in the cylinders 4a by the pistons 7 is maximized, the discharge amount of the fluid to the discharge chamber 2 is increased, and the cooling capacity of the air conditioning system is maximized.

Figure 2:
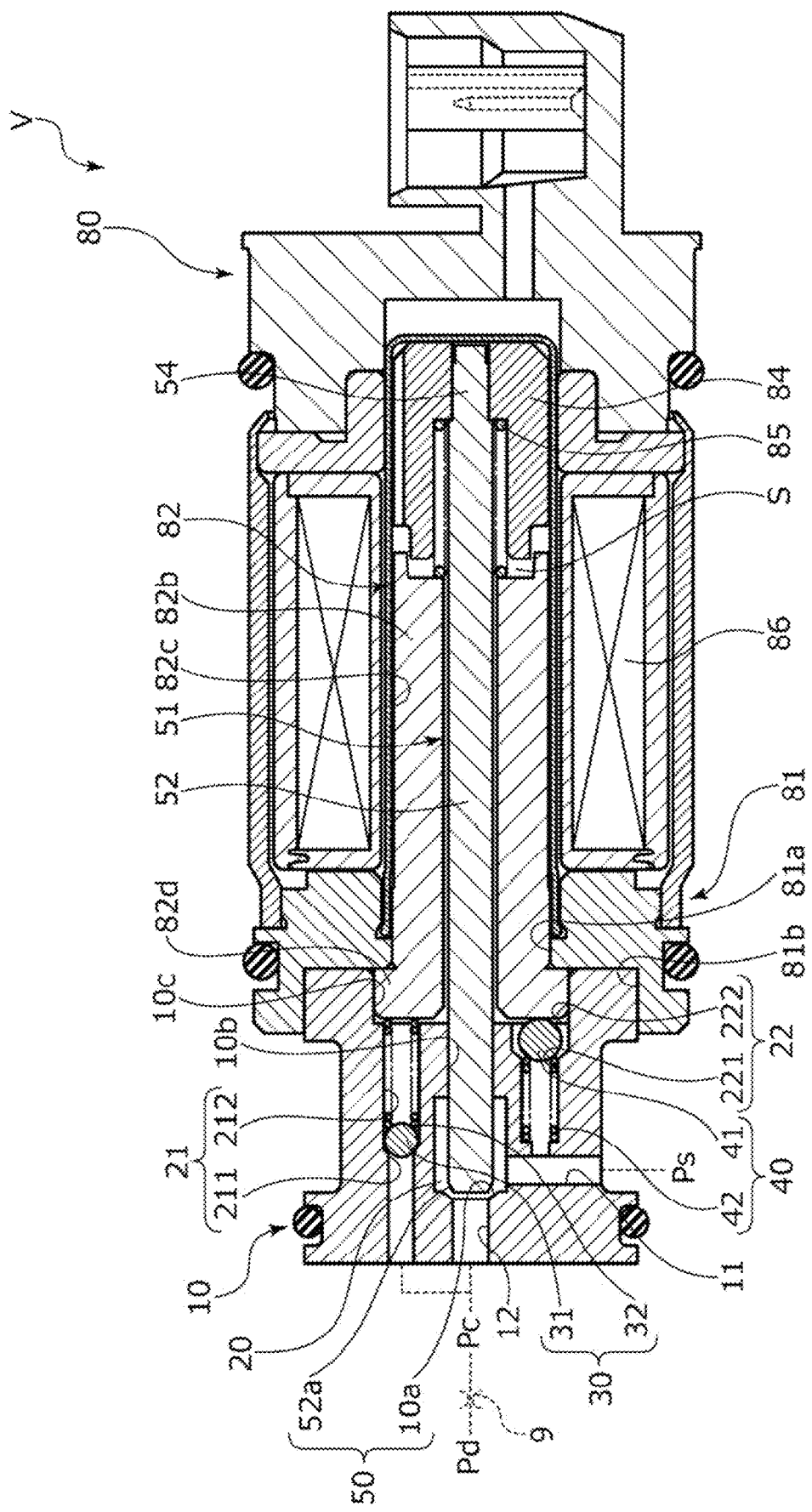
FIG. 2 is a cross-sectional view showing a state where a CS valve is opened when the capacity control valve according to the first embodiment is in a non-energized state.

As shown in FIG. 2, the capacity control valve V assembled into the variable displacement compressor M adjusts electric current which energizes a coil 86 forming the solenoid 80, and controls the opening and closing of a CS valve 50 in the capacity control valve V, to control the fluid flowing out from the control chamber 4 to the suction chamber 3, and thereby the control pressure Pc in the control chamber 4 is variably controlled. Incidentally, a discharge fluid of the discharge pressure Pd of the discharge chamber 2 is always supplied to the control chamber 4 via the fixed orifice 9, and the CS valve 50 in the capacity control valve V is closed to increase the control pressure Pc in the control chamber 4.

In the present embodiment, the CS valve 50 includes a control-suction valve body (also referred to as a CS valve body) 51 as a valve body, and a CS valve seat 10a formed in an inner peripheral surface of the valve housing 10. An axially left end 52a of a large-diameter portion 52 of the CS valve body 51 comes into contact with and separates from the CS valve seat 10a to open and close the CS valve 50.

Next, a structure of the capacity control valve V will be described. As shown in FIG. 2, the capacity control valve V mainly includes the valve housing 10 made of a metallic material or a resin material; the CS valve body 51 of which an axially left end portion is disposed inside the valve housing 10; and the solenoid 80 connected to the valve housing 10 to exert a driving force on the CS valve body 51.

As shown in FIG. 2, the CS valve body 51 includes the large-diameter portion 52 that is a columnar body having a constant cross section, and a small-diameter portion 54 having a smaller diameter than that of the large-diameter portion 52 and extending rightward in an axial direction, and also serves as a rod that is disposed through the coil 86 of the solenoid 80.

As shown in FIG. 2, the solenoid 80 mainly includes a casing 81 including an opening portion 81a that is open leftward in the axial direction; a center post 82 that has a substantially cylindrical shape, and that is inserted into the opening portion 81a of the casing 81 from the left in the axial direction to be disposed between a radially inner side of the casing 81 and a radially inner side of the valve housing 10; the CS valve body 51 which is inserted into the center post 82 to be reciprocatable in the axial direction, and of which the axially left end portion is disposed inside the valve housing 10; a movable iron core 84 to which an axially right end portion of the CS valve body 51 is inserted and fixed; a coil spring 85 as a spring provided between the center post 82 and the movable iron core 84 to bias the movable iron core 84 rightward in the axial direction, which is a valve opening direction of the CS valve 50; and the coil 86 for excitation wound on an outer side of the center post 82 with a bobbin interposed therebetween.

The center post 82 is made of a rigid body that is a magnetic material such as iron or silicon steel, and includes a cylindrical portion 82b provided with an insertion hole 82c into which the CS valve body 51 extending in the axial direction is inserted, and a flange portion 82d having an annular shape and extending from an outer peripheral surface of an axially left end portion of the cylindrical portion 82b in a radially outward direction.

Figure 3:
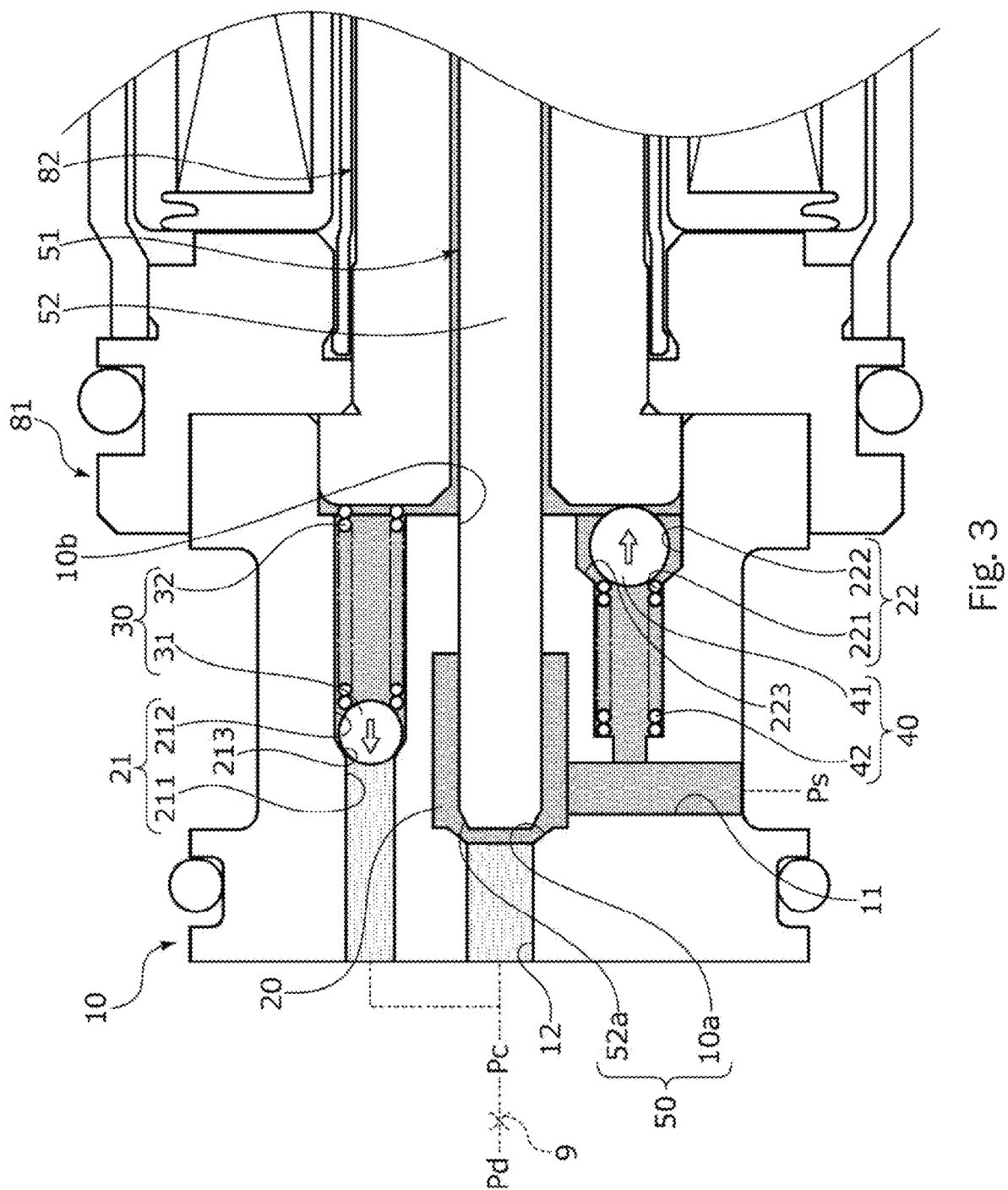
FIG. 3 is an enlarged view of main parts showing a state where the CS valve is opened when the capacity control valve according to the first embodiment is in the non-energized state, and showing a pressure distribution in a state where a first pressure-actuated valve is closed and a second pressure-actuated valve is opened when a control pressure is low. Incidentally, in order to show the pressure distribution, the hatching of a cross section of each member is omitted.

As shown in FIGS. 2 and 3, a Ps port 11 is formed in the valve housing 10, as a suction port that penetrates through the valve housing 10 in the radial direction to communicate with the suction chamber 3 of the variable displacement compressor M. In addition, a Pc port 12 is formed on a radially inner side of an axially left end of the valve housing 10, as a control port that communicates with the control chamber 4 of the variable displacement compressor M.

A valve chamber 20 is formed inside the valve housing 10, and the axially left end 52a of the large-diameter portion 52 of the CS valve body 51 is disposed in the valve chamber 20 so as to be reciprocatable in the axial direction. In addition, the Ps port 11 extends from an outer peripheral surface of the valve housing 10 in a radially inward direction to communicate with the valve chamber 20. In addition, the Pc port 12 extends rightward from the radially inner side of the axially left end of the valve housing 10 in the axial direction to communicate with the valve chamber 20.

The CS valve seat 10a is formed in the inner peripheral surface of the valve housing 10 at an opening end edge on a valve chamber 20 side of the Pc port 12. In addition, the CS valve seat 10a, and a guide hole 10b against which an outer peripheral surface of the CS valve body 51 is slidable on a solenoid 80 side of the valve chamber 20 are formed in the inner peripheral surface of the valve housing 10. Namely, the CS valve seat 10a and the guide hole 10b are integrally formed in the inner peripheral surface of the valve housing 10. Incidentally, an inner peripheral surface of the guide hole 10b and the outer peripheral surface of the CS valve body 51 are slightly separated from each other in a radial direction to form a very small gap therebetween. The CS valve body 51 is smoothly movable relative to the valve housing 10 in the axial direction.

In addition, a recessed portion 10c recessed leftward in the axial direction is formed on an axially right side of the valve housing 10, and the flange portion 82d of the center post 82 is inserted and fixed to the recessed portion 10c from the right in the axial direction in a substantially sealed manner, and the casing 81 is inserted and fixed to the valve housing 10 from the right in the axial direction in a substantially sealed manner, so that the valve housing 10, the center post 82, and the casing 81 are integrally connected to each other. Incidentally, an opening end on the solenoid 80 side of the guide hole 10b is formed on a radially inner side of a bottom surface of the recessed portion 10c of the valve housing 10. In such a manner, in a state where the valve housing 10, the center post 82, and the casing 81 are integrally connected to each other, an axially right end surface of the valve housing 10 and an axially right side surface of the flange portion 82d of the center post 82 abut against a bottom surface of a recessed portion 81b formed on an axially left side of the casing 81, and the bottom surface of the recessed portion 10c of the valve housing 10 and an axially left end surface of the center post 82 are separated from each other in the axial direction to form a gap therebetween.

In addition, a through-hole 21 extending in the axial direction between an axially left end surface of the valve housing 10 and a bottom portion of the recessed portion 10c is formed in the valve housing 10. The through-hole 21 includes a small-diameter hole portion 211 of which an axially left end communicates with the control chamber 4 of the variable displacement compressor M, and a large-diameter hole portion 212 extending continuously from an axially right end of the small-diameter hole portion 211 and having a larger diameter than that of the small-diameter hole portion 211. An axially right end of the large-diameter hole portion 212 is open to the gap formed between the bottom surface of the recessed portion 10c and the axially left end surface of the center post 82. Incidentally, the control fluid of the control pressure Pc is supplied into the Pc port 12 and the small-diameter hole portion 211 of the through-hole 21 from the control chamber 4 of the variable displacement compressor M.

An actuating valve body 31 having a ball shape, and a return spring 32 of which an axially right end is fixed to the axially left end surface of the center post 82 and of which an axially left end abuts against the actuating valve body 31 from the right in the axial direction are disposed in the large-diameter hole portion 212 of the through-hole 21. The actuating valve body 31 is biased leftward in the axial direction by the return spring 32. The actuating valve body 31 and the return spring 32 form a first pressure-actuated valve 30 as a pressure-actuated valve that controls a communication between the control chamber 4 of the variable displacement compressor M and an internal space S of the casing 81 in the through-hole 21 that is a flow passage. Incidentally, the internal space S of the casing 81 communicates with an internal space of the center post 82 and the gap formed between the bottom surface of the recessed portion 10c of the valve housing 10 and the axially left end surface of the center post 82.

In addition, a through-hole 22 extending in the axial direction between an inner peripheral surface of the Ps port 11 that is a through-hole extending in the radial direction, and the bottom portion of the recessed portion 10c at the axially right end is formed in the valve housing 10. The through-hole 22 includes a small-diameter hole portion 221 of which an axially left end communicates with the inside of the Ps port 11, and a large-diameter hole portion 222 extending continuously from an axially right end of the small-diameter hole portion 221 and having a larger diameter than that of the small-diameter hole portion 221. An axially right end of the large-diameter hole portion 222 is open to the gap formed between the bottom surface of the recessed portion 10c of the valve housing 10 and an axially left end of the center post 82. Incidentally, the pressure in the valve chamber 20, inside the Ps port 11, and inside the small-diameter hole portion 221 in the valve housing 10 is a fluid pressure that is generated on a downstream side of the CS valve 50 by opening and closing of the CS valve 50.

An actuating valve body 41 having a ball shape and a return spring 42 as a biasing device of which an axially left end is fixed inside the small-diameter hole portion 221 and of which an axially right end abuts against the actuating valve body 41 from the left in the axial direction are disposed in the large-diameter hole portion 222 and the small-diameter hole portion 221 of the through-hole 22. The actuating valve body 41 is biased rightward in the axial direction. The actuating valve body 41 and the return spring 42 form a second pressure-actuated valve 40 as a flow passage control device for controlling a communication between the Ps port 11 and the internal space S of the casing 81 in the through-hole 22 that is a flow passage.

Incidentally, the internal space S of the casing 81 always communicates with the Ps port 11 via a throttle. Specifically, the very small gap between the inner peripheral surface of the guide hole 10b and the outer peripheral surface of the CS valve body 51 functions as a throttle. The fluid in the internal space S of the casing 81 can be gently released to the Ps port 11, and a state where a pressure difference between the pressure of the fluid in the valve chamber 20 and the pressure of the fluid in the internal space S of the casing 81 is small is maintained during non-use for a long time.

Next, an operation of the capacity control valve V, mainly, an opening and closing operation of the CS valve 50 will be described.

First, a non-energized state of the capacity control valve V will be described. As shown in FIGS. 2 and 3, when the capacity control valve V is in the non-energized state, the movable iron core 84 is pressed rightward in the axial direction by a biasing force of the coil spring 85, so that the CS valve body 51 moves rightward in the axial direction, and the axially left end 52a of the large-diameter portion 52 of the CS valve body 51 separates from the CS valve seat 10a to open the CS valve 50.

At this time, the biasing force $F_{sp1}$ of the coil spring 85, and a force $F_{P1}$ due to the pressure of the fluid on an axially left end surface of the CS valve body 51 are applied rightward to the CS valve body 51 in the axial direction, and a force $F_{P2}$ due to the pressure of the fluid on an axially right end surface of the CS valve body 51 is applied leftward in the axial direction. Namely, a force $F_{rod}=F_{sp}+F_{P1}-F_{P2}$ is applied to the CS valve body 51, given that a right direction is positive. Incidentally, when the CS valve 50 is opened, the force $F_{P1}$ due to the pressure of the fluid on the axially left end surface of the CS valve body 51 is a force due to the pressure of the fluid in the valve chamber 20, which is applied to the axially left end 52a of the large-diameter portion 52 of the CS valve body 51. On the other hand, the force $F_{P2}$ due to the pressure of the fluid on the axially right end surface of the CS valve body 51 is a force due to the pressure of the fluid that has flowed around from the valve chamber 20 to a back side of the CS valve body 51 through the gap between the inner peripheral surface of the guide hole 10b of the valve housing 10 and the outer peripheral surface of the CS valve body 51, namely, the pressure of the fluid existing in the internal space S of the casing 81. The force $F_{P1}$ due to the pressure of the fluid on the axially left end surface of the CS valve body 51 is relatively higher than the force $F_{P2}$ due to the pressure of the fluid on the axially right end surface of the CS valve body 51 (i.e., $F_{P1}>F_{P2}$).

Figure 4:
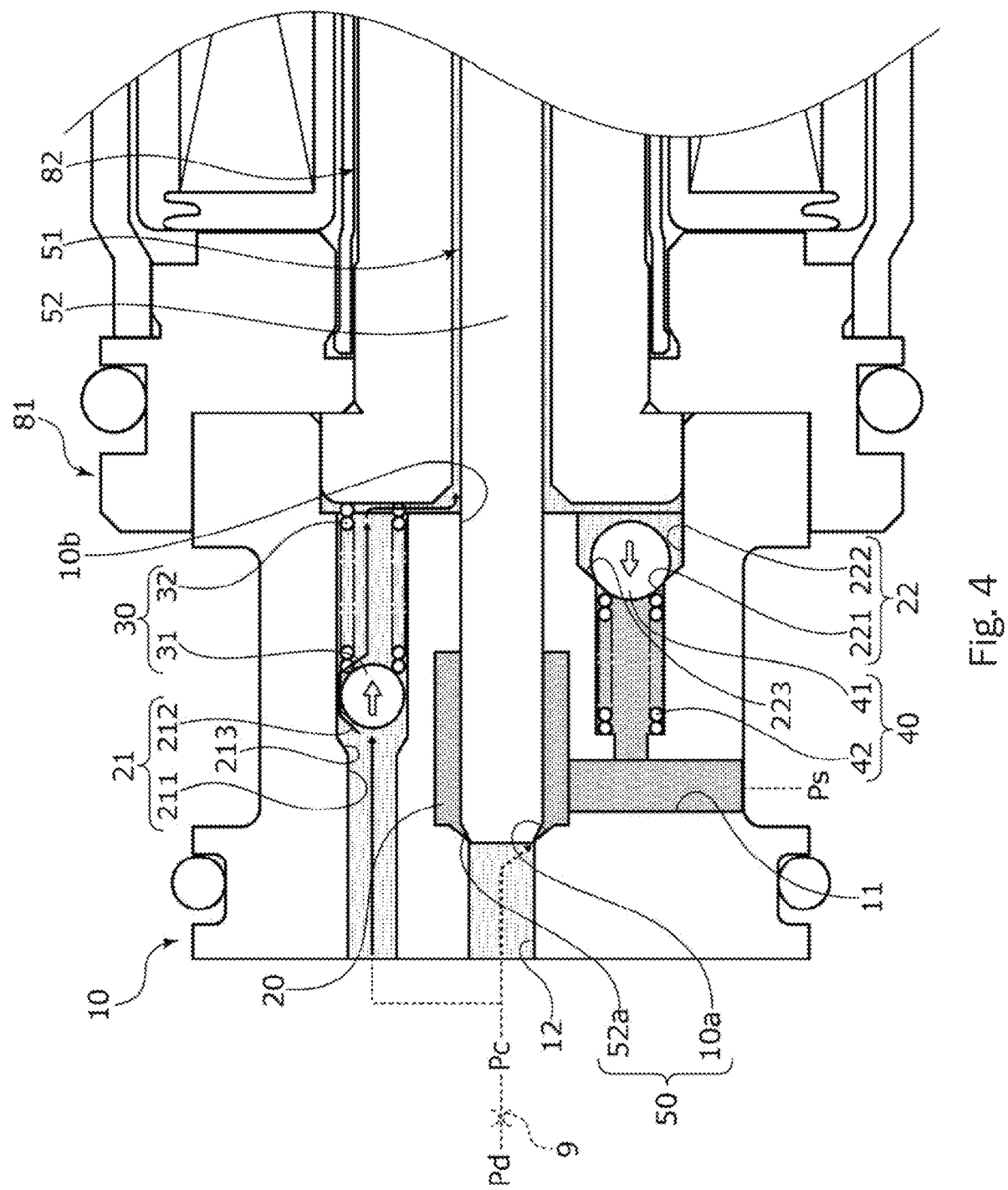
FIG. 4 is an enlarged view of main parts showing a state where the CS valve is closed when the capacity control valve according to the first embodiment is in an energized state, and showing a pressure distribution in a state where the first pressure-actuated valve is opened and the second pressure-actuated valve is closed when the control pressure is high. Incidentally, in order to show the pressure distribution, the hatching of a cross section of each member is omitted.

Next, an energized state of the capacity control valve V will be described with reference to FIG. 4. As shown in FIG. 4, when the capacity control valve V is in the energized state, namely, in normal control, in other words, in duty control, if an electromagnetic force $F_{sol}$ generated by the application of an electric current to the solenoid 80 is larger than the force $F_{rod}$ (i.e., $F_{sol}>F_{rod}$), the movable iron core 84 is pulled toward a center post 82 side, namely, to the axially left side, and the CS valve body 51 fixed to the movable iron core 84 moves together leftward in the axial direction, so that the axially left end 52a of the CS valve body 51 is seated on the CS valve seat 10a of the valve housing 10 to close the CS valve 50.

At this time, the electromagnetic force $F_{sol}$ to the left in the axial direction and the force $F_{rod}$ to the right in the axial direction are applied to the CS valve body 51 (namely, a force $F_{rod}-F_{sol}$ is applied to the CS valve body 51, given that the right direction is positive). Incidentally, when the CS valve 50 is closed, the force $F_{P1}$ due to the pressure of the fluid on the axially left end surface of the CS valve body 51 is a force due to the control pressure Pc of the control fluid inside the Pc port 12.

Next, when the control pressure Pc is high or when the control pressure Pc is desired to be rapidly increased, a transition from a fully open state of the CS valve 50, namely, the non-energized state of the capacity control valve V to a fully closed state of the CS valve 50, namely, a maximum energized state of the capacity control valve V will be described. In the fully open state of the CS valve 50 shown in FIG. 3, when the control pressure Pc is high, a pressure difference between the control pressure Pc of the control fluid inside the Pc port 12, the pressure of the fluid in the valve chamber 20 and the pressure of the fluid in the internal space S of the casing 81 is increased, and the force $F_{P1}$ due to the control pressure Pc of the control fluid inside the Pc port 12 is greatly applied to the CS valve body 51 to bias the CS valve body 51 rightward in the axial direction, namely, in the valve opening direction, so that a large application electric current is required to move the CS valve body 51 leftward in the axial direction. In addition, also when the control pressure Pc is desired to be rapidly increased, a large application electric current is required to move the CS valve body 51 leftward in the axial direction.

As shown in FIG. 4, when the control pressure Pc is high, the actuating valve body 31 of the first pressure-actuated valve 30 moves rightward in the axial direction against a biasing force of the return spring 32 and the pressure of the fluid in the internal space S of the casing 81 to separate from a tapered valve seat 213 formed in a connecting portion between the axially right end of the small-diameter hole portion 211 and the axially left end of the large-diameter hole portion 212 of the through-hole 21, so that the first pressure-actuated valve 30 is opened. At this time, a force $F_{P11}$ due to the control pressure Pc inside the small-diameter hole portion 211 which is larger than the biasing force $F_{sp11}$ of the return spring 32 and a force $F_{P12}$ due to the pressure of the fluid in the internal space S of the casing 81 is applied rightward to the actuating valve body 31 in the axial direction (i.e., $F_{P11}>F_{sp11}+F_{P12}$, and shown by a white arrow in FIG. 4).

Accordingly, the control chamber 4 of the variable displacement compressor M and the internal space S of the casing 81 communicate with each other through the through-hole 21, the control fluid of the control pressure Pc is supplied from the control chamber 4 of the variable displacement compressor M to the internal space S of the casing 81 through the through-hole 21, and the pressure difference between the control pressure Pc of the control chamber 4 of the variable displacement compressor M and the pressure of the fluid in the internal space S of the casing 81 is reduced. Hence, an influence of the force $F_{P1}$ due to the control pressure Pc of the control fluid inside the Pc port 12 which is applied to the CS valve body 51 is reduced, so that the CS valve body 51 can be smoothly operated leftward in the axial direction, namely, in a valve closing direction, and responsiveness to control of the variable displacement compressor M at high output can be improved.

In addition, since a pressure difference between the pressure of the fluid inside the small-diameter hole portion 221 of the through-hole 22 communicating with the Ps port 11 on the downstream side of the CS valve 50, and the pressure of the fluid in the internal space S of the casing 81 increases because of the supply of the control fluid of the control pressure Pc to the internal space S of the casing 81, the actuating valve body 41 of the second pressure-actuated valve 40 moves leftward in the axial direction against a biasing force of the return spring 42 and the pressure of the fluid inside the small-diameter hole portion 221 to be seated on a tapered valve seat 223 formed in a connecting portion between the axially right end of the small-diameter hole portion 221 and the axially left end of the large-diameter hole portion 222 of the through-hole 22, so that the second pressure-actuated valve 40 is closed in a substantially sealed manner. At this time, a force $F_{P22}$ due to the pressure of the fluid in the internal space S of the casing 81 which is larger than a combined force of the biasing force $F_{sp21}$ of the return spring 42 and a force $F_{P21}$ due to the pressure of the fluid inside the small-diameter hole portion 221 is applied leftward to the actuating valve body 41 in the axial direction (i.e., $F_{sp21}+F_{P21}<F_{P22}$, and shown by a white arrow in FIG. 4).

Accordingly, the Ps port 11 and the internal space S of the casing 81 enter a non-communication state, and the fluid supplied from the control chamber 4 of the variable displacement compressor M to the internal space S of the casing 81 through the through-hole 21 is not discharged to the Ps port 11 through the through-hole 22. Hence, the pressure of the fluid in the internal space S of the casing 81 can be efficiently increased.

Here, as shown in FIG. 4, when the capacity control valve V switches from a state where because of an increase in the control pressure Pc, the first pressure-actuated valve 30 is opened to reduce the pressure difference between the control pressure Pc and the pressure of the fluid in the internal space S of the casing 81, to the non-energized state to open the CS valve 50 (see FIG. 5), the Pc port 12 and the Ps port 11 communicate with each other, the control fluid of the control pressure Pc is discharged from the control chamber 4 of the variable displacement compressor M to the suction chamber 3, and the control pressure Pc decreases.

Figure 5:
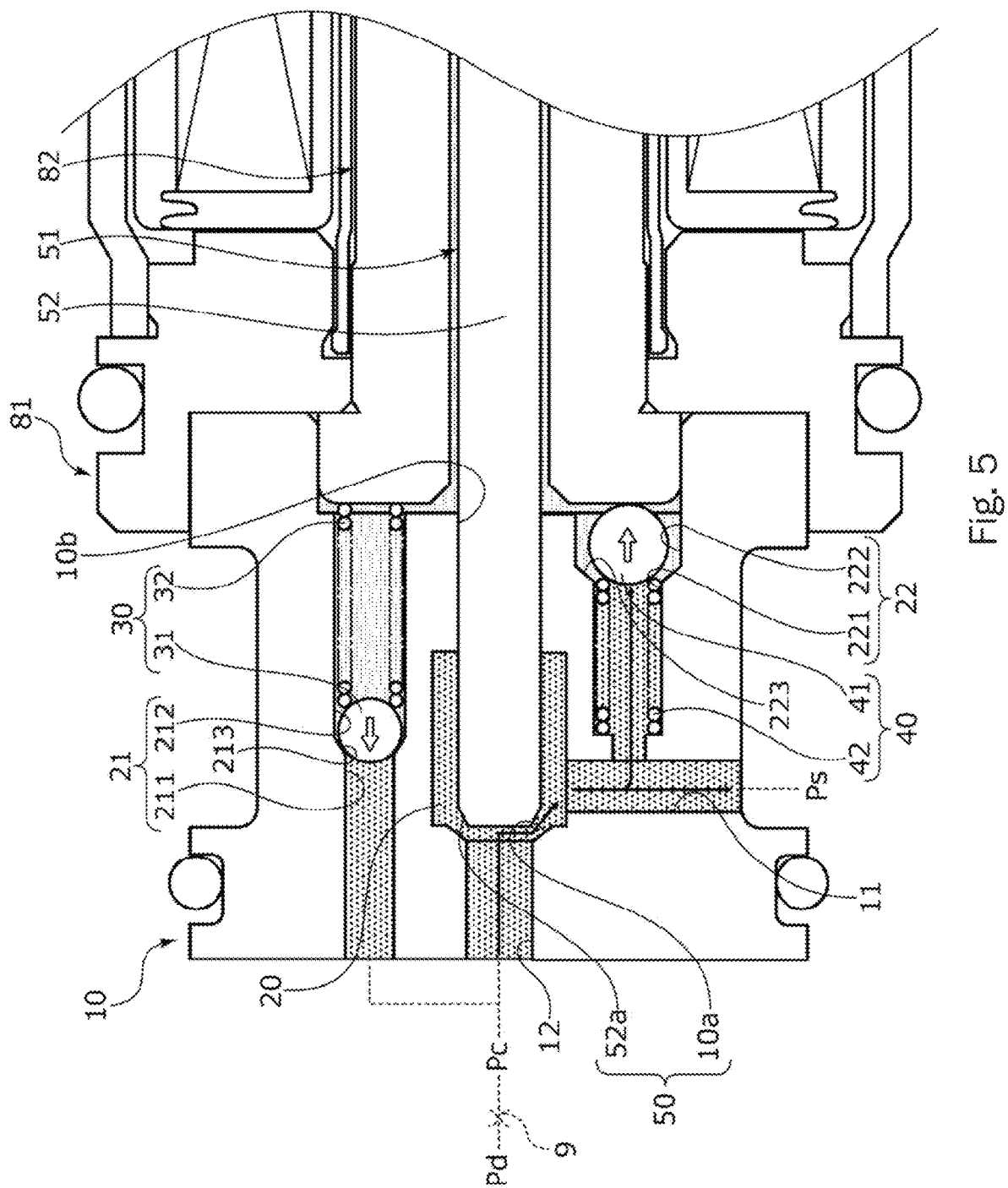
FIG. 5 is an enlarged view of main parts showing a pressure distribution in a state where when the capacity control valve according to the first embodiment switches from the energized state in FIG. 4 to the non-energized state to open the CS valve, the first pressure-actuated valve is opened and the second pressure-actuated valve is closed. Incidentally, in order to show the pressure distribution, the hatching of a cross section of each member is omitted.

As shown in FIG. 5, when the capacity control valve V switches from the energized state to the non-energized state to open the CS valve 50, the control pressure Pc of the Pc port 12 decreases. At this time, since the first pressure-actuated valve 30 is in a valve open state, when the pressure of the fluid in the internal space S of the casing 81 decreases to a pressure close to the control pressure Pc of the Pc port 12, and the biasing force of the return spring 32 is larger than a force due to a differential pressure applied to the actuating valve body 31, the first pressure-actuated valve 30 is closed. In addition, since a part of the fluid to be discharged from the Pc port 12 to the Ps port 11 through the valve chamber 20 flows into the small-diameter hole portion 221 of the through-hole 22, and the pressure inside the small-diameter hole portion 221 rises higher than pressure immediately before opening (see a solid line arrow in FIG. 5), the second pressure-actuated valve 40 is opened, and the internal space S of the casing 81 communicates with the Ps port 11. Therefore, when the pressure of the fluid in the internal space S of the casing 81 decreases to a pressure close to the suction pressure Ps of the Ps port 11, and the biasing force of the return spring 42 is larger than a force due to a differential pressure applied to the actuating valve body 41, the second pressure-actuated valve 40 maintains a valve open state. At this time, the combined force of the biasing force $F_{sp21}$ of the return spring 42 and the force $F_{P21}$ due to the pressure on the downstream side of the CS valve 50, namely, the pressure of the fluid inside the small-diameter hole portion 221, which is larger than the force $F_{P22}$ due to the pressure of the fluid in the internal space S of the casing 81, is applied rightward to the actuating valve body 41 in the axial direction (i.e., $F_{sp21}+F_{P21}>F_{P22}$, and shown by a white arrow in FIG. 5).

Accordingly, the internal space S of the casing 81 and the Ps port 11 communicate with each other through the through-hole 22, the fluid in the internal space S of the casing 81 is discharged from the internal space S of the casing 81 to the Ps port 11 through the through-hole 22, and the pressure of the fluid in the internal space S of the casing 81 decreases rapidly. Hence, the pressure difference between the control pressure Pc of the control fluid inside the Pc port 12 and the pressure of the fluid in the internal space S of the casing 81 is reduced. Therefore, an influence of the force $F_{P2}$ due to the pressure of the fluid in the internal space S of the casing 81 which is applied to the CS valve body 51 is reduced, so that the CS valve body 51 can be smoothly operated rightward in the axial direction, namely, in the valve opening direction, and responsiveness when the CS valve 50 starts opening from a valve closed state can be improved. Incidentally, in FIG. 5, a pressure distribution immediately after transition from the energized state to the non-energized state is shown by dots, and it goes without saying that the pressure inside the capacity control valve V becomes uniform over time.

In addition, since the CS valve 50 is opened, and the control pressure Pc decreases, the biasing force is applied leftward to the actuating valve body 31 of the first pressure-actuated valve 30 in the axial direction, namely, in the valve closing direction by the return spring 32, and the actuating valve body 31 is seated on the valve seat 213, so that the first pressure-actuated valve 30 is closed in a substantially sealed manner. At this time, a combined force of the biasing force $F_{sp11}$ of the return spring 32 and the force $F_{P12}$ due to the pressure of the fluid in the internal space S of the casing 81, which is larger than the force $F_{P11}$ due to the control pressure Pc inside the small-diameter hole portion 211, is applied leftward to the actuating valve body 31 in the axial direction (i.e., $F_{P11}<F_{sp11}+F_{P12}$, and shown by a white arrow in FIG. 5).

Accordingly, the control chamber 4 of the variable displacement compressor M and the internal space S of the casing 81 enter a non-communication state, and the supply of the control fluid of the control pressure Pc to the internal space S of the casing 81 is cut off. Hence, the pressure of the fluid in the internal space S of the casing 81 can be decreased more rapidly because of opening of the second pressure-actuated valve 40 described above, and responsiveness to control for the CS valve 50 to start opening from a valve closed state can be further improved.

In addition, the flow passage control device of the present embodiment is formed of the second pressure-actuated valve 40 in which a force due to the fluid pressure on the downstream side of the CS valve 50, namely, the force $F_{P21}$ due to the pressure of the fluid inside the small-diameter hole portion 221 of the through-hole 22 communicating with the Ps port 11, and the biasing force $F_{sp21}$ of the return spring 42 are opposed to the force $F_{P22}$ due to the pressure of the fluid in the internal space S of the casing 81. Since the biasing force of the return spring 42 is used for an opening and closing operation of the second pressure-actuated valve 40, a flow passage can be reliably opened and closed which discharges the pressure of the fluid in the internal space S of the casing 81 according to a pressure difference between the fluid pressure on the downstream side of the CS valve 50 generated by opening and closing of the CS valve 50, and the pressure of the fluid in the internal space S of the casing 81, and the reliability of the opening and closing operation of the second pressure-actuated valve 40 is high.

In addition, since the second pressure-actuated valve 40 is capable of operating the actuating valve body 41 biased by the return spring 42 according to the pressure difference between the fluid pressure generated because of a decrease in the control pressure Pc by opening of the CS valve 50, and the pressure of the fluid in the internal space S of the casing 81, the flow passage control device for decreasing the pressure of the fluid in the internal space S of the casing 81 can be simply configured.

In addition, since the second pressure-actuated valve 40 is provided in the through-hole 22 of the valve housing 10 which communicates with the Ps port 11, and the flow passage control device can be formed using the through-hole 22 communicating with the existing Ps port 11, the structure of the capacity control valve V can be simplified.

In addition, since the CS valve seat 10a and the guide hole 10b are integrally formed in the valve housing 10, the accuracy of operation of the CS valve body 51 can be improved.

Second Embodiment

A capacity control valve according to a second embodiment of the present invention will be described with reference to FIGS. 6 to 9. Incidentally, a description of the same and duplicated configurations as the configurations of the first embodiment will be omitted.

Figure 6:
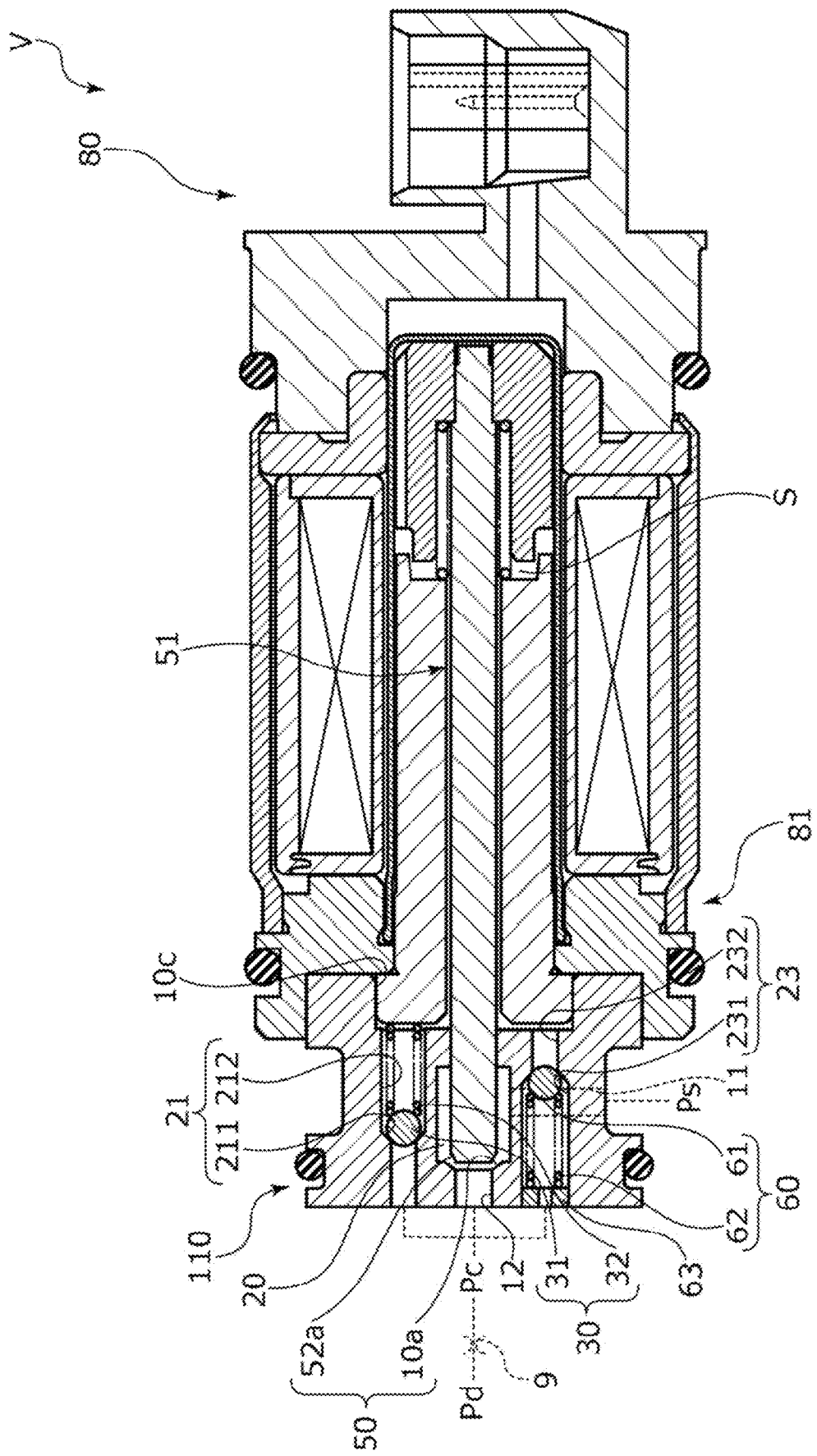
FIG. 6 is a cross-sectional view showing a state where a CS valve is opened when a capacity control valve according to a second embodiment of the present invention is in a non-energized state.

As shown in FIG. 6, in the present embodiment, a through-hole 23 extending in the axial direction between an axially left end surface and the bottom portion of the recessed portion 10c is formed in the valve housing 110. The through-hole 23 includes a large-diameter hole portion 231 of which an axially left end communicates with the control chamber 4 of the variable displacement compressor M, and a small-diameter hole portion 232 extending continuously from an axially right end of the large-diameter hole portion 231 and having a smaller diameter than that of the large-diameter hole portion 231. Incidentally, the pressure inside the Pc port 12, inside the small-diameter hole portion 211 of the through-hole 21, and inside the large-diameter hole portion 231 of the through-hole 23 in the valve housing 110 is a fluid pressure on an upstream side of the CS valve 50, namely, the control pressure Pc of the control fluid to be supplied from the control chamber 4 of the variable displacement compressor M.

An actuating valve body 61 having a ball shape, and a return spring 62 as a biasing device of which an axially left end is fixed to an axially right end of a fixed ring 63 inserted and fixed to an axially left opening end portion of the large-diameter hole portion 231 and of which an axially right end abuts against the actuating valve body 61 from the left in the axial direction are disposed in the large-diameter hole portion 231 of the through-hole 23. The actuating valve body 61 is biased rightward in the axial direction by the return spring 62. The actuating valve body 61 and the return spring 62 form a second pressure-actuated valve 60 as a flow passage control device for controlling a communication between the upstream side of the CS valve 50 and the internal space S of the casing 81.

Figure 7:
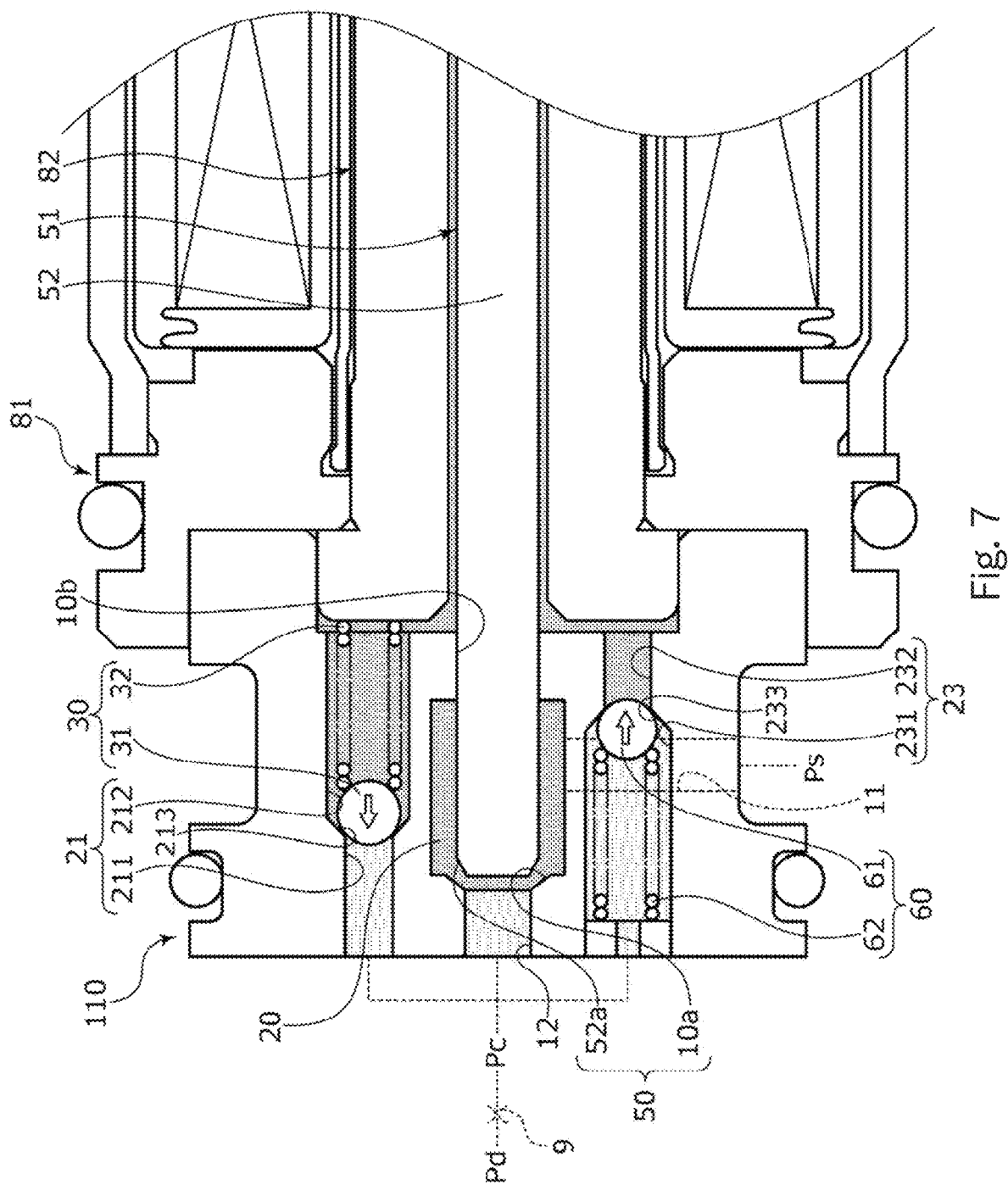
FIG. 7 is an enlarged view of main parts showing a state where the CS valve is opened when the capacity control valve according to the second embodiment is in the non-energized state, and showing a pressure distribution in a state where a first pressure-actuated valve and a second pressure-actuated valve are closed when a control pressure is low. Incidentally, in order to show the pressure distribution, the hatching of a cross section of each member is omitted.

As shown in FIG. 7, when the control pressure Pc is low, and the pressure difference between the control pressure Pc and the pressure of the fluid in the internal space S of the casing 81 is small, the actuating valve body 31 of the first pressure-actuated valve 30 is moved leftward in the axial direction by the biasing force of the return spring 32 and the pressure of the fluid in the internal space S of the casing 81 to be seated on the valve seat 213, so that the first pressure-actuated valve 30 is closed in a substantially sealed manner. At this time, a combined force of the biasing force $F_{sp11}$ of the return spring 32 and the force $F_{P12}$ due to the pressure of the fluid in the internal space S of the casing 81, which is larger than the force $F_{P11}$ due to the control pressure Pc inside the small-diameter hole portion 211, is applied leftward to the actuating valve body 31 in the axial direction (i.e., $F_{P11}<F_{sp11}+F_{P12}$, and shown by a white arrow in FIG. 7).

In addition, the actuating valve body 61 of the second pressure-actuated valve 60 is moved rightward in the axial direction by a biasing force of the return spring 62 and the pressure of the fluid inside the large-diameter hole portion 231 of the through-hole 23 to be seated on a tapered valve seat 233 formed in a connecting portion between the axially right end of the large-diameter hole portion 231 and an axially left end of the small-diameter hole portion 232 of the through-hole 23, so that the second pressure-actuated valve 60 is closed in a substantially sealed manner. At this time, a combined force of the biasing force $F_{sp31}$ of the return spring 62 and a force $F_{P31}$ due to the pressure of the fluid inside the large-diameter hole portion 231, which is larger than a force $F_{P32}$ due to the pressure of the fluid in the internal space S of the casing 81, is applied rightward to the actuating valve body 61 in the axial direction (i.e., $F_{sp31}+F_{P31}>F_{P32}$, and shown by a white arrow in FIG. 7).

Figure 8:
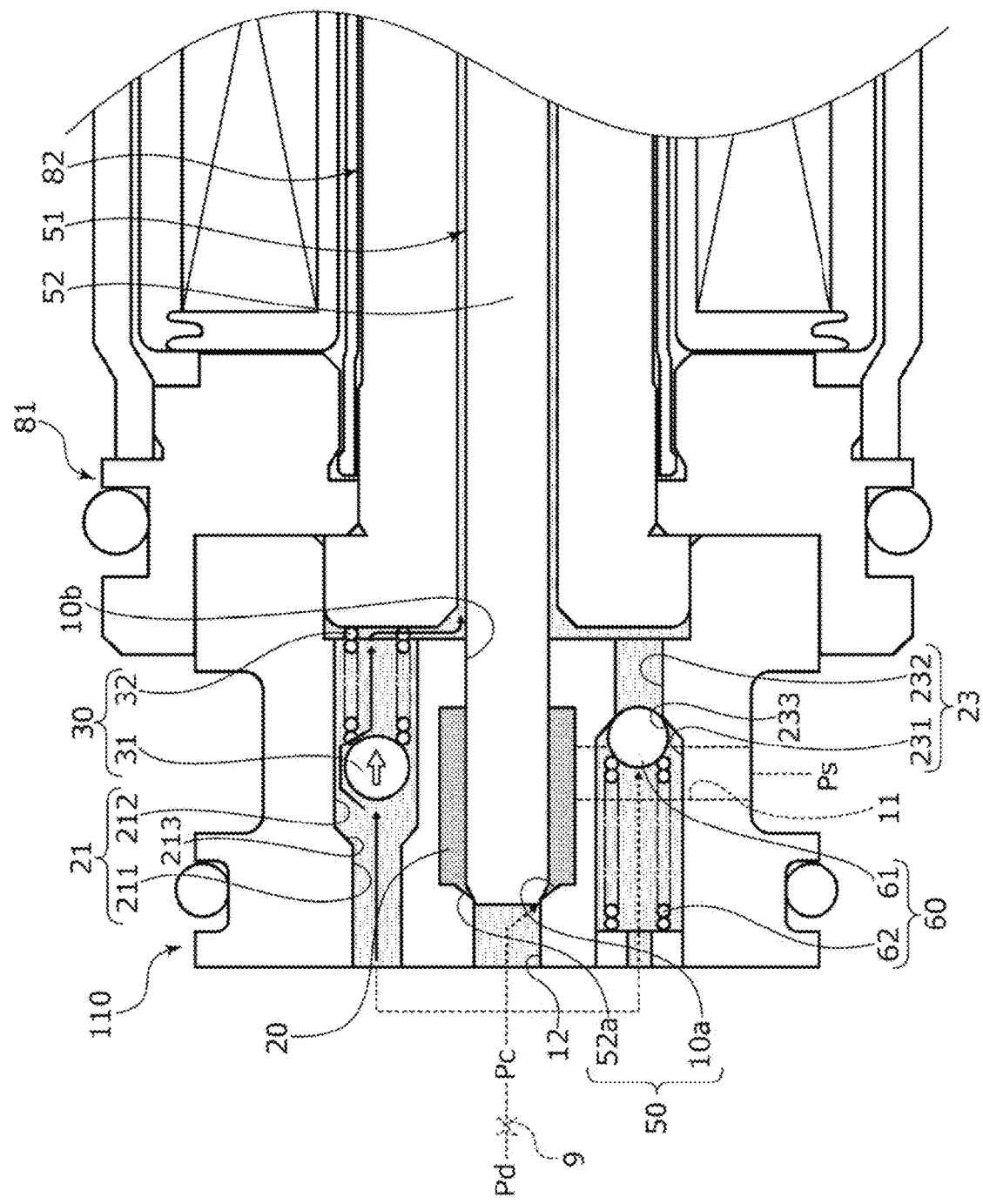
FIG. 8 is an enlarged view of main parts showing a state where the CS valve is closed when the capacity control valve according to the second embodiment is in an energized state, and showing a pressure distribution in a state where the first pressure-actuated valve is opened and the second pressure-actuated valve is closed when the control pressure is high. Incidentally, in order to show the pressure distribution, the hatching of a cross section of each member is omitted.

As shown in FIG. 8, when the control pressure Pc is high, and the pressure difference between the control pressure Pc and the pressure of the fluid in the internal space S of the casing 81 is large, the actuating valve body 31 of the first pressure-actuated valve 30 moves rightward in the axial direction against the biasing force of the return spring 32 and the force due to the pressure of the fluid in the internal space S of the casing 81 to separate from the valve seat 213, so that the first pressure-actuated valve 30 is opened. At this time, the force $F_{P11}$ due to the control pressure Pc inside the small-diameter hole portion 211 which is larger than the combined force of the biasing force $F_{sp11}$ of the return spring 32 and the force $F_{P12}$ due to the pressure of the fluid in the internal space S of the casing 81 is applied rightward to the actuating valve body 31 in the axial direction (i.e., $F_{P11}>F_{sp11}+F_{P12}$, and shown by a white arrow in FIG. 8).

Accordingly, the control chamber 4 of the variable displacement compressor M and the internal space S of the casing 81 communicate with each other through the through-hole 21, the control fluid of the control pressure Pc is supplied from the control chamber 4 of the variable displacement compressor M to the internal space S of the casing 81 through the through-hole 21, and the pressure difference between the control pressure Pc of the control chamber 4 of the variable displacement compressor M and the pressure of the fluid in the internal space S of the casing 81 is reduced. Hence, an influence of the force $0F_{P1}$ due to the control pressure Pc of the control fluid inside the Pc port 12 which is applied to the CS valve body 51 is reduced, so that the CS valve body 51 can be smoothly operated leftward in the axial direction, namely, in a valve closing direction, and responsiveness to control of the variable displacement compressor M at high output can be improved.

In addition, since the pressure difference between the control pressure Pc of the control fluid inside the large-diameter hole portion 231 of the through-hole 23 and the pressure of the fluid in the internal space S of the casing 81 is reduced because of the supply of the control fluid of the control pressure Pc to the internal space S of the casing 81, the actuating valve body 61 of the second pressure-actuated valve 60 is pressed against the valve seat 233 mainly by the biasing force of the return spring 62, and a state where the second pressure-actuated valve 60 is closed in a substantially sealed manner is maintained.

Figure 9:
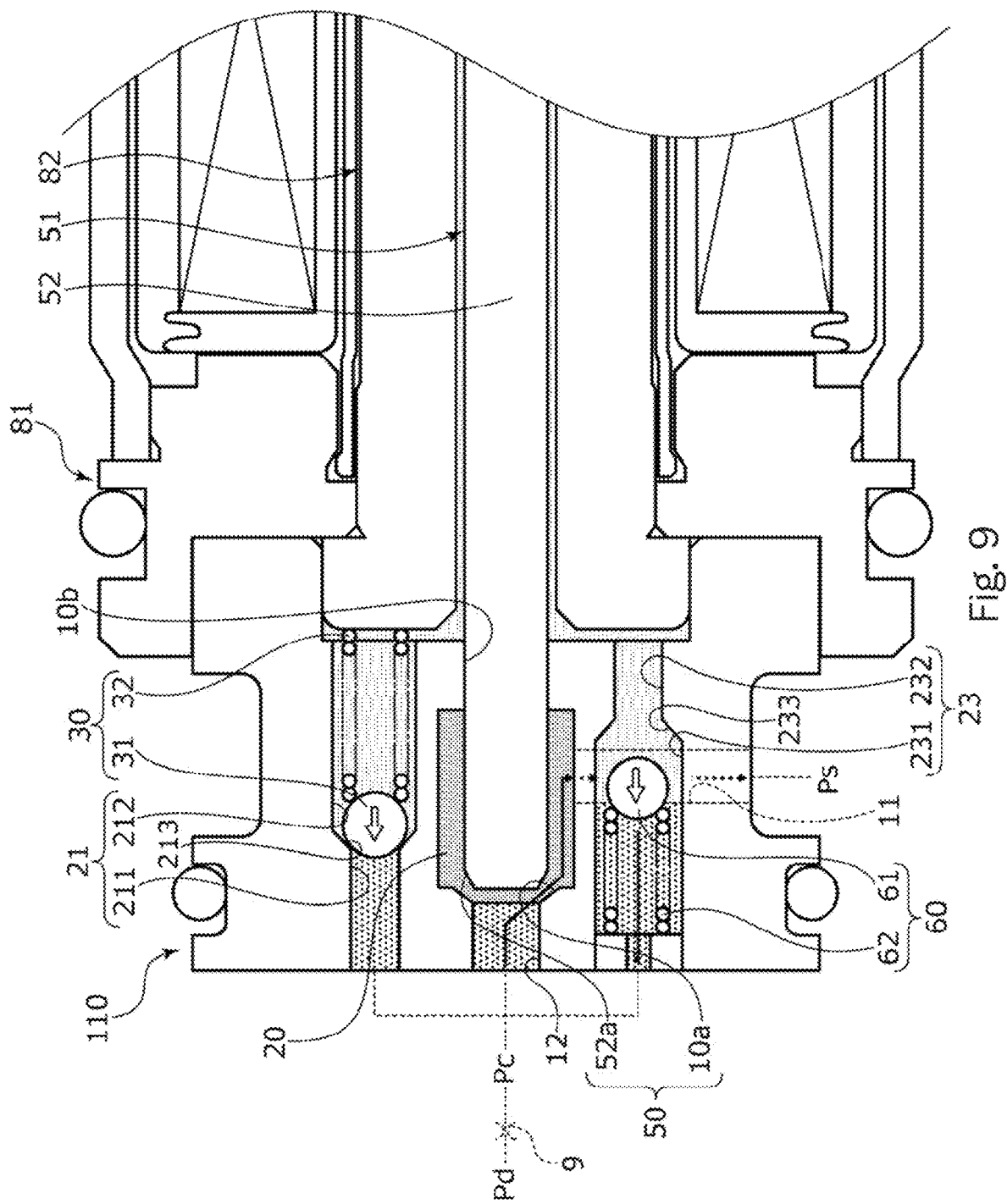
FIG. 9 is an enlarged view of main parts showing a pressure distribution in a state where when the capacity control valve according to the second embodiment switches from the energized state in FIG. 8 to the non-energized state to open the CS valve, the first pressure-actuated valve is closed and the second pressure-actuated valve is opened. Incidentally, in order to show the pressure distribution, the hatching of a cross section of each member is omitted.

Next, as shown in FIG. 9, when the capacity control valve V switches from the energized state to the non-energized state to open the CS valve 50, the control fluid is discharged from the Pc port 12 to the Ps port 11 through the valve chamber 20 (see a solid line arrow in FIG. 9), so that the pressure of the fluid inside the large-diameter hole portion 231 of the through-hole 23 decreases, and a pressure difference between the pressure of the fluid inside the large-diameter hole portion 231 and the pressure of the fluid inside the small-diameter hole portion 232 of the through-hole 23, namely, the pressure of the fluid in the internal space S of the casing 81 is increased. Therefore, the actuating valve body 61 of the second pressure-actuated valve 60 moves leftward in the axial direction against the biasing force of the return spring 62 and the force due to the pressure of the fluid inside the large-diameter hole portion 231 to separate from the valve seat 233, so that the second pressure-actuated valve 60 is opened. At this time, the force $F_{P32}$ due to the pressure of the fluid in the internal space S of the casing 81 which is larger than a combined force of the biasing force $F_{sp31}$ of the return spring 62 and the force $F_{P31}$ due to the pressure of the fluid inside the large-diameter hole portion 231 is applied leftward to the actuating valve body 61 in the axial direction (i.e., $F_{P31}+F_{sp31}<F_{P32}$, and shown by a white arrow in FIG. 9).

Accordingly, the internal space S of the casing 81 and the control chamber 4 of the variable displacement compressor M communicate with each other through the through-hole 23, the fluid in the internal space S of the casing 81 is discharged from the internal space S of the casing 81 through the through-hole 23, the Pc port 12, and the Ps port 11, and the pressure of the fluid in the internal space S of the casing 81 decreases rapidly. Hence, the pressure difference between the control pressure Pc of the control fluid inside the Pc port 12 and the pressure of the fluid in the internal space S of the casing 81 is reduced. Therefore, an influence of the force $F_{P2}$ due to the pressure of the fluid in the internal space S of the casing 81 which is applied to the CS valve body 51 is reduced, so that the CS valve body 51 can be smoothly operated rightward in the axial direction, namely, in the valve opening direction, and responsiveness when the CS valve 50 starts opening from a valve closed state can be improved. Incidentally, in FIG. 9, a pressure distribution immediately after transition from the energized state to the non-energized state is shown by dots, and it goes without saying that the pressure inside the capacity control valve V becomes uniform over time.

In addition, when the pressure of the fluid in the internal space S of the casing 81 decreases because of opening of the second pressure-actuated valve 60, and the pressure difference between the pressure of the fluid inside the large-diameter hole portion 231 and the pressure of the fluid in the internal space S of the casing 81 is reduced, the second pressure-actuated valve 60 is closed, and the second pressure-actuated valve 60 is repeatedly opened and closed according to the pressure difference between the pressure of the fluid inside the large-diameter hole portion 231 and the pressure of the fluid in the internal space S of the casing 81. Therefore, a state where the pressure difference between the pressure of the fluid inside the large-diameter hole portion 231, namely, the control pressure Pc and the pressure of the fluid in the internal space S of the casing 81 is small can be maintained, and controllability of the capacity control valve V even during normal control can be improved.

In addition, since the CS valve 50 is opened, and the control pressure Pc decreases, the biasing force is applied leftward to the actuating valve body 31 of the first pressure-actuated valve 30 in the axial direction, namely, in the valve closing direction by the return spring 32, and the actuating valve body 31 is seated on the valve seat 213, so that the first pressure-actuated valve 30 is closed in a substantially sealed manner. Incidentally, since a state where the first pressure-actuated valve 30 is closed is maintained until the control pressure Pc increases, the pressure difference between the control pressure Pc and the pressure of the fluid in the internal space S of the casing 81 is easily adjusted by the opening and closing operation of the second pressure-actuated valve 60 described above.

In addition, the flow passage control device of the present embodiment is formed of the second pressure-actuated valve 60 in which a force due to the fluid pressure on the upstream side of the CS valve 50, namely, the force $F_{P31}$ due to the pressure of the fluid inside the large-diameter hole portion 231 and the biasing force $F_{sp21}$ of the return spring 62 are opposed to the force $F_{P32}$ due to the pressure of the fluid in the internal space S of the casing 81. Since the biasing force of the return spring 62 is used for the opening and closing operation of the second pressure-actuated valve 60, a flow passage can be reliably opened and closed which discharges the pressure of the fluid in the internal space S of the casing 81 according to a pressure difference between the fluid pressure on the upstream side of the CS valve 50 generated by opening and closing of the CS valve 50, namely, the control pressure Pc and the pressure of the fluid in the internal space S of the casing 81, and the reliability of the opening and closing operation of the second pressure-actuated valve 60 is high.

In addition, since the second pressure-actuated valve 60 is provided in the through-hole 23 of the valve housing 110 which communicates with the control chamber 4 of the variable displacement compressor M, and the flow passage control device can be formed using the through-hole 23 formed in the existing valve housing 110, the structure of the capacity control valve V can be simplified.

The embodiments of the present invention have been described above with reference to the drawings; however, the specific configuration is not limited to the embodiments, and changes or additions which are made without departing from the scope of the present invention are included in the present invention.

For example, in the first and second embodiments, the mode has been described in which the CS valve body is provided in a drive rod that is disposed through the coil 86 of the solenoid 80; however, the present invention is not limited to the mode, and the CS valve body may be configured to be reciprocatable integrally with a separate rod in the axial direction.

In addition, in the first and second embodiments, the CS valve seat and the guide hole have been described as being integrally formed in the inner peripheral surface of the valve housing; however, the present invention is not limited thereto, and a valve housing including the CS valve seat and a valve housing including the guide hole may be provided separately.

In addition, a guide portion is not limited to being formed in the valve housing, and may be formed, for example, in a part of the insertion hole 82c of the center post 82.

In addition, in the first and second embodiments, the CS valve body 51 has been described as being biased in the axial direction by the coil spring 85 forming the solenoid 80; however, the present invention is not limited thereto, and an auxiliary spring that biases the CS valve body in the axial direction may be provided in the axially left end portion of the CS valve body, and the CS valve body may be biased in the axial direction by the coil spring 85 and the auxiliary spring on axially both sides of the CS valve body, so that an axial operation of the CS valve body is stabilized.

In addition, in the first and second embodiments, the flow passage control device has been described as being formed of a pressure-actuated valve; however, the present invention is not limited thereto, and the flow passage control device may adjust the opening degree of the throttle.

In addition, in the first and second embodiments, the mode has been described in which the first pressure-actuated valve 30 to be actuated to open and close a communication between the upstream side of the CS valve 50 and the internal space S of the casing 81 by a pressure difference is provided; however, the present invention is not limited to the mode, and the first pressure-actuated valve may not necessarily be provided.

REFERENCE SIGNS LIST

1 Casing
2 Discharge chamber
3 Suction chamber
4 Control chamber
10 Valve housing
10a CS valve seat
11 Ps port (suction port)
12 Pc port (control port)
20 Valve chamber
21, 22, 23 Through-hole
30 First pressure-actuated valve (pressure-actuated valve)
31 Actuating valve body
32 Return spring
40 Second pressure-actuated valve (flow passage control device)
41 Actuating valve body
42 Return spring (biasing device)
50 CS valve
51 CS valve body (valve body)
60 Second pressure-actuated valve (flow passage control device)
61 Actuating valve body
62 Return spring (biasing device)
63 Fixed ring
80 Solenoid
85 Coil spring (spring)
110 Valve housing M Variable displacement compressor
Pc Control pressure
Pd Discharge pressure
Ps Suction pressure
S Space
V Capacity control valve

The invention claimed is:

1. A capacity control valve comprising:
a valve housing provided with a suction port through which a suction fluid of a suction pressure passes and a control port through which a control fluid of a control pressure passes;
a valve body driven by a solenoid and having a pressure receiving surface on which the control pressure having a direction opposed to a driving direction of the solenoid acts;
a spring that biases the valve body in a direction opposite to a direction of driving by the solenoid; and
a control-suction valve that includes a control-suction valve seat and the valve body, and that opens and closes a communication between the control port and the suction port,
wherein the capacity control valve further comprises
a supply device that supplies the control fluid of the control pressure to a back side of the valve body which is a side opposed to the pressure receiving surface of the valve body, and
a flow passage control device that uses a fluid pressure generated by opening and closing of the control-suction valve and a pressure on the back side of the valve body to decrease the pressure on the back side of the valve body.

2. The capacity control valve according to claim 1, wherein the flow passage control device includes an actuating valve body and a biasing device, and
the flow passage control device is a valve in which a force due to the fluid pressure generated by opening and closing of the control-suction valve and a biasing force of the biasing device are opposed to a force due to the pressure on the back side of the valve body.

3. The capacity control valve according to claim 2, wherein the fluid pressure is a pressure on a downstream side of the control-suction valve, and the biasing device biases the actuating valve body in a valve opening direction.

4. The capacity control valve according to claim 2, wherein the fluid pressure is a pressure on an upstream side of the control-suction valve, and the biasing device biases the actuating valve body in a valve closing direction.

5. The capacity control valve according to claim 1, further comprising:
the supply device is a pressure-actuated valve to be actuated to open and close a communication between an upstream side of the control-suction valve and the back side of the valve body by a pressure difference.

6. The capacity control valve according to claim 3, wherein the flow passage control device is provided in a through-hole of the valve housing, the through-hole communicating with the suction port.

7. The capacity control valve according to claim 4, wherein the flow passage control device is provided in a through-hole of the valve housing, the through-hole communicating with the upstream side of the control-suction valve.

8. The capacity control valve according to claim 2, further comprising:
the supply device is a pressure-actuated valve to be actuated to open and close a communication between an upstream side of the control-suction valve and the back side of the valve body by a pressure difference.

9. The capacity control valve according to claim 3, further comprising:
the supply device is a pressure-actuated valve to be actuated to open and close a communication between an upstream side of the control-suction valve and the back side of the valve body by a pressure difference.

10. The capacity control valve according to claim 4, further comprising:
the supply device is a pressure-actuated valve to be actuated to open and close a communication between an upstream side of the control-suction valve and the back side of the valve body by a pressure difference.

11. The capacity control valve according to claim 8,
wherein the flow passage control device is provided in a through-hole of the valve housing, the through-hole communicating with the upstream side of the control-suction valve.

12. The capacity control valve according to claim 9,
wherein the flow passage control device is provided in a through-hole of the valve housing, the through-hole communicating with the upstream side of the control-suction valve.

13. The capacity control valve according to claim 10,
wherein the flow passage control device is provided in a through-hole of the valve housing, the through-hole communicating with the upstream side of the control-suction valve.

* * * * *